3,534,073
PHOSPHONATED ESTERS
Morton Lewis, Elmhurst, Ill., assignor to Swift & Company, Chicago, Ill., a corporation of Delaware
No Drawing. Filed Oct. 11, 1967, Ser. No. 674,670
Int. Cl. C07f 9/14
U.S. Cl. 260—403                                    10 Claims

ABSTRACT OF THE DISCLOSURE

Fatty esters containing organically bound phosphorus are produced by replacing a halide function on the acyl portion of the ester with a phosphonate function.

---

This invention relates to new compositions of matter and more specifically to the production of hydrophobic materials containing either phosphonate groups on adjacent carbons or phosphonate groups adjacent to halo groups. The compositions are aliphatic esters of alcohols and polyols with fatty acids wherein the acyl moiety of the ester contains halogen and phosphonate groups and are useful as flame retardants and lubricating oil additives.

A specific embodiment of the invention relates to the treatment of cellulosic materials and more particularly to a method whereby combustible cellulosic materials can be rendered flameproof and at the same time bonded either to themselves or to other substrates.

It is an object of this invention to prepare novel compositions of matter.

It is also an object of this invention to provide substituted higher fatty acid derivatives having adjacent phosphonate groups and/or a phosphonate group adjacent to a halo group.

Another object of this invention is the provision of a flameproofing adhesive composition and laminated webs or sheets of cellulosic material which possess an improved resistance to combustion.

Additional objects, if not specifically set forth herein, will be readily apparent to those skilled in the art from the detailed description of the invention which follows.

Generally, compositions of this invention comprise derivatives of halogenated fatty esters of monohydric or polyhydric alcohols wherein the acyl moieties contain one or more adjacent phosphonate groups and/or a phosphonate group adjacent to an halogen group. The products are formed by reacting a trialkyl or triaryl phosphite with halogenated fatty acid ester. In carrying out the process, it is possible to remove all of the halogen in the halogenated oil by adding an equivalent amount of trialkyl phosphite for all the halide and thus synthesize a completely phosphonated oil. In those instances where halogen is desirable, i.e., in flameproofing compositions, the totally phosphonated oil lies outside the scope of this class of compounds. However, the totally phosphonated oils, having phosphonate groups on adjacent carbons, are also novel compositions of matter and possess properties as additives for lubricating oils. The fully phosphonated esters improve the wear and extreme pressure properties of petroleum and synthetic diester lubricants.

The formation of the compounds of this invention may be represented as follows:

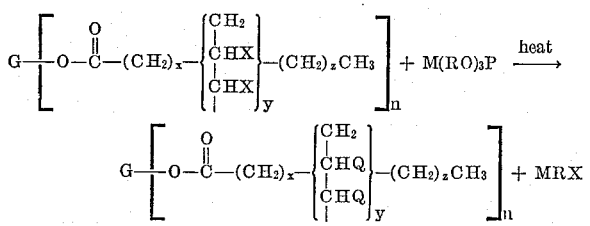

wherein G is a hydrocarbon of less than about 8 carbons with a functionality of up to 5; X is chloro, bromo or iodo; Q is X, —PO(OR)$_2$ or H; $n$ is an integer of from 1 to about 5 and preferably 3; $x$ is an integer of 0–7; $y$ is an integer of 1–5; $z$ is an integer of 0–7; $x+3y+z$ is 9–24; M represents the number of moles of phosphite utilized and is equal to 1–2 moles of phosphite per each $y$ since $y$, in the reactant contains 2 halogens. R is an organic radical of 1–20 carbons generally represented by straight or branched chain alkyl, alkenyl, and halo alkyl radicals. Compounds of this invention have the further proviso that at least one Q in the molecule is a —PO(OR)$_2$ group and in those compositions useful for flameproofing properties, at least one Q is X.

As can be seen from the above formula, the compositions of this invention are phosphonate derivatives of halogenated higher fatty acid esters wherein the alcohol portion of the ester may be described as one containing 1–5 hydroxyl groups prior to esterification.

A specific embodiment of the invention comprises the products produced by reacting a portion of the halogen in a polyhalogenated aliphatic ester, especially triglycerides, with a particular phosphite. A convenient source of these materials can be made from unsaturated animal, vegetable, and marine triglycerides, well known in the art, which can readily be halogenated to yield the corresponding halogenated oil. Examples include brominated and chlorinated soybean oil, linseed oil, sesame oil, perilla oil, safflower oil, rapeseed oil, cottonseed oil, castor oil, lard, tallow and fish oil such as menhaden and sardine oil, as well as sperm oil. These naturally-occurring ethylenically unsaturated materials can be halogenated by methods well known in the art to provide compositions having varying amounts of halogenation in which the halides are predominately vicinal. Generally, it is desirable that the halogenated triglyceride contain more than about 20% by weight of halogen but oils containing up to about 60% halogen, by weight, are useful. Further, the halogenated component can also be a mixture of halogenated materials such as a mixture of brominated soybean oil and brominated cottonseed oil.

Aliphatic alcohols which may be esterified with higher fatty acids or reacted with particular fatty acid esters in a transesterification reaction include mono- and polyhydric alcohols of 1–8 carbon atoms. Dihydric alcohols which may be employed include ethylene glycol, 1,2-propanediol, 1,3-propanediol, dimethylethylene glycol, 1,4-butanediol, 1,4-butenediol, 1,4-butyenediol, 1,5-pentanediol, 1,6-hexanediol, 2-methyl-2,4-pentanediol, etc. Polyhydric alcohols which may be esterfied include glycerol, 1,2,3-butanetriol, erythritol, pentaerythritol and hexitols such as mannitol and sorbitol.

Suitable unsaturated fatty acids (including the cis-trans isomers) which may be esterfied with alcohols prior to halogenation to give a convenient source of polyhalogenated aliphatic esters include the monounsaturated fatty acids such as oleic or undecyleric, the diunsaturated fatty acids such as hexadecatrienoic; octadecatrienoic, eicosaenoic, hexacosadienoic, as well as the polyunsaturated acids such as hexadecatrienoice, octadecatrienoic, eicosatrienoic, docosatrienoic, hexadecatetraenoic, octadecatetraenoic, eicosatetraenoic, docosatetraenoic, docosapentaenoic, tetracosapentaenoic, hexadosapentaenoic, docosahexaenoic, and tetracosahexaenoic acids.

In preparing the novel compositions of this invention, a trialkyl phosphite is reacted with the halogenated oil (1 mole of phosphite per each halogen to be removed) at temperatures of between about 125° C. to 225° C. During the reaction, air or nitrogen can be used to strip off the alkyl halide which is formed. The reaction mixture will generally begin to bubble vigorously at temperatures of around 125°–150° C. The temperature is then slowly raised to about 190° C. to 210° C. and maintained for about 3–10 hours. If more phosphite than is desired to react is used the excess phosphite must be removed before it all reacts.

Highly desirable phosphite reactants that can be used may be represented by the formula: $(RO)_3P$ wherein R is a straight or branched chain alkyl, alkenyl, or haloalkyl radical of 1–20 carbons, preferably 1 to 8 carbons. Examples include trimethylphosphite, triethylphosphite, tripropylphosphite, triisopropylphosphite, tributylphosphite, triisobutyl phosphite, triheptylphosphite, trioctylphosphite, etc. Mixed phosphites such as ethyldimethylphosphite, methyldiethylphite, ethyldibutylphosphite, propyldidoceylphosphite, dibutyloctadecenylphosphite, etc., may be used.

Also included are the halogenated phosphites such as tri-(beta-chloroethyl)phosphite, ethyl di-(beta-chloroethyl)-phosphite, dipropyl(beta - chlorethyl)phosphite, etc. Of particular importance are the unsaturated phosphites such as triallyl phosphite inasmuch as these compounds, after being attached to the fatty ester provide multiple active sites for subsequent halogenation.

The flameproofing adhesive compositions formulated with the compounds of this invention comprise dispersions of a film-forming adhesive and the phosphonated-halogenated aliphatic compound. The invention contemplates applying this flameproofing adhesive mixture to the surface of paper, fabric, wood or other essentially cellulosic fibrous material, spreading the said flameproofing adhesive over the surface in a continuous film and causing said cellulosic material to be bonded either to other cellulosic materials or to non-cellulosic substrates.

The flameproofing adhesive compositions comprise about 50 to 85% of an adhesive known in the art as suitable cellulosic adhesive, and about 15 to 50% of a phosphonated halogenated fatty acid derivative defined above. The adhesive component of the mixture usually comprises the major portion of the flameproofing adhesive composition and can be any known adhesive adapted for use on cellulosic materials. The adhesives should be insoluble or immiscible with the phosphonated-halogenated component, and this incompatibility should extend to the compositions in the dry form.

As a general rule, larger amounts of the halogenated-phosphonated composition are required if chlorinated rather than brominated glycerides are used. In the preferred embodiment of the invention, the brominated-phosphonated glyceride will contain at least 20% bromine by weight and at least 3% phosphorus by weight.

The following examples illustrate the production of the composition, within the scope of the present invention. These examples are presented herein merely for purposes of illustrating the invention.

EXAMPLE I

A 250 ml., 3-neck round bottom flask was equipped with an air inlet, a reflux condenser with a gas outlet leading to a Dry Ice trap, and thermometer. Into this flask was weighed 117.5 g. of brominated cottonseed oil (37% by weight bromine—0.545 eq.) and 17.7 g. (0.143 mole) of trimethylphosphite. The reaction mixture was heated with a glas-col heating mantle and the temperature brought to about 205–210° C. A very slow stream of nitrogen was passed over the reaction in order to facilitate removal of the byproduct (methyl bromide). At a temperature of about 150° C., the reaction mixture began to bubble vigorously. The temperature was slowly raised until it reached the 205–210° C. where it was maintained for a total reaction time of about 5 hours. The product was then cooled and taken up in hexane. The hexane solution was washed with water and then dried over sodium sulfate. The hexane was removed by evaporation under reduced pressure to give a dark amber oil that analyzed about 25.2% bromine and about 3.65% phosphorus. The Dry Ice trap contained 15.6 grams of a water-white, very low boiling, liquid that was proven to be methyl bromide. This was established by making the quaternary salt with pyridine. The recrystallized sample was identical in melting point and mixed melting point to a known sample of methyl pyridinium bromide.

EXAMPLE II

A three-neck round bottom flask was charged with 118 g. of brominated soybean oil (40% by weight bromine—0.59 eq.) and 23.7 g. (0.143 mole) of triethylphosphate. The reaction was heated to about 205° C. and maintained between 200° C. and 210° C. for about 5½ hours. A very slow stream of nitrogen was passed over the reaction in order to remove ethyl bromide. The product was cooled and taken up in hexane. The hexane solution was washed with water and then dried over sodium sulfate. The hexane was removed by evaporation under reduced pressure to give a dark amber oil that contained about 28% bromine and about 3.6% phosphorus.

EXAMPLE III

A 250 ml. 3-neck round bottom flask was equipped with an air inlet, a reflux condenser with a gas outlet leading to a Dry Ice trap, and a thermometer. Into this flask was weighed 120 g. brominated castor oil (28% by weight bromine—0.42 eq.) and 18 g. (0.14 mole) of trimethylphosphite. The reaction mixture was heated with a glas-col heating mantle to a temperature of about 205°–210° C. A slow stream of nitrogen was passed over the reaction in order to facilitate removal of methyl bromide. The product was worked up in a manner similar to the procedure set forth in Example I above, to give a very dark oil that contained about 20% bromine and about 2.5% phosphorus.

EXAMPLE IV

A properly equipped vessel was charged with 91.2 g. (0.2 mole) of methyl 9,10-dibromostearate and 12.4 g. (0.1 mole) trimethylphosphite. The reaction was run for approximately three hours at 175° C. and then for approximately six hours at 205–210° C. A very slow stream of nitrogen was passed over the reaction mass in order to facilitate removal of the byproduct (methyl bromide). After the product had cooled, it was taken up in hexane. The hexane solution was washed with water and dried over sodium sulfate. The hexane was removed by evaporation under reduced pressure to give an oil that analyzed 23.6% bromine and 1.91% phosphorus. The Dry Ice trap contained a small quantity of a water-white, very low boiling, liquid which was shown to be methyl bromide.

EXAMPLE V

The following ingredients were admixed to form a smooth dispersion: Phosphonated-brominated soybean oil (25% bromine and 3.65% phosphorus), 25%; and Everflax-B polyvinyl acetate emulsion, 75%.

This formula was applied on the surface of 30-pound kraft paper which was laminated with another web of 30-pound kraft paper and the laminate dried. The lamination was placed in an oven and dried for 2 minutes at about 100° C. 24 hours later, the lamination was tested for flameproofness according to ASTM method D777–46. The laminate showed excellent flameproofing properties.

The phosphonate groups in the compounds of this invention are bound through a carbon phosphorus linkage (organically bound phosphorus) and, therefore, are not phosphate esters and are not subject to hydrolysis. Since the phosphorus is bound to a carbon atom and is not subject to hydrolysis, the phosphorus and halogen species, which tend to act synergistically in flame retardant applications, cannot be separated from each other. In applications wherein an aqueous media is used, as in the type of water-based adhesives used for paper laminations, this is a great advantage over prior art compositions. The flame retardant additive formulated into this type of adhesive will not hydrolyze and lose its effectiveness.

Obviously many modifications and variations of the invention as hereinbefore set forth may be made without departing from the spirit and scope thereof, and, therefore, only those limitations should be imposed as are indicated in the appended claims.

I claim:

1. A novel composition of matter represented by the formula:

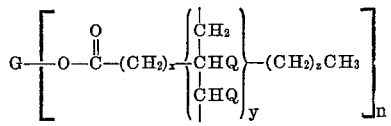

wherein G is a hydrocarbon of less than about 8 carbons with a functionality of up to 5; Q is X, —PO(OR)$_2$ or H; X is chloro, bromo or iodo; $n$ is an integer of from 1 to about 5; $x$ is an integer of about 0–7; $y$ is an integer of about 1–5; $z$ is an integer of from about 0–7; $x+3y+z$ is 9–24; at least one Q in the molecule is a —PO(OR)$_2$ radical and the adjacent Q is either X or a —PO(OR)$_2$ radical and R is a straight or branched chain alkyl, alkenyl, or haloalkyl radical of 1–20 carbons.

2. The composition of claim 1 wherein $n$ is 3 and G is a 3 carbon hydrocarbon having a functionality of three.

3. The composition of claim 1 wherein $n$ is 1 and G is a 1–8 atom hydrocarbon having a functionality of one.

4. The composition of claim 1 wherein one Q is a —PO(OR)$_2$ radical, the adjacent Q is a —PO(OR)$_2$ radical and all other Q's are hydrogen or —PO(OR)$_2$ radicals.

5. The composition of claim 1 wherein $n$ is 3, G is a 3 carbon hydrocarbon having a functionality of three, at least one Q is a —PO(OR)$_2$ radical and the adjacent Q is either a —PO(OR)$_2$ radical or halogen atom and R is a hydrocarbon radical of less than 8 carbon atoms.

6. The composition of claim 1 wherein $n$ is 3, G is a 3 carbon hydrocarbon having a functionality of three such that the composition is a substituted glyceride of a member selected from the group consisting of cottonseed oil, soybean oil and castor oil.

7. A process for the preparation of a phosphonated ester of a fatty acid which comprises reacting a polyhalogenated fatty acid ester having vicinal halogen on the acyl portion of the ester with a sufficient amount of triorganic phosphite at a temperature above about 125° C. so as to produce a phosphonated ester having at least one phosphonate group and either another phosphonate group or a halogen on the carbon atom adjacent to the carbon atom attached to the first-mentioned phosphonate group.

8. The process of claim 7 wherein the ester is a halogenated glyceride and the phosphite is a member selected from the group consisting of trialkyl phosphites, trialkenyl phosphites, and trihaloalkyl phosphites.

9. The process of claim 7 wherein the ester is a halogenated glyceride and is selected from the group consisting of halogenated cottonseed oil, halogenated soybean oil and halogenated castor oil.

10. The process of claim 7 wherein the phosphite is selected from the group consisting of trimethyl phosphite and triethyl phosphite and the halogenated ester is a brominated glyceride.

References Cited

UNITED STATES PATENTS

| 3,189,628 | 6/1965 | Knight et al. | 260—403 |
| 3,410,812 | 11/1968 | Bahr et al. | 260—2.5 |
| 2,973,380 | 2/1961 | Swern | 260—403 |

ELBERT L. ROBERTS, Primary Examiner

U.S. Cl. X.R.

252—49.8

PO-1050
(5/69)

UNITED STATES PATENT OFFICE
CERTIFICATE OF CORRECTION

Patent No. 3,534,073      Dated October 13, 1970

Inventor(s) Morton Lewis

It is certified that error appears in the above-identified patent and that said Letters Patent are hereby corrected as shown below:

Column 2, line 58 after "as" cancel "hexadecatrienoic; octadecatrienoic, eicosaenoic, hexacosadienoic," and substitute therefor --octadecadienoic, nonadecadienoic, eicosadienoic, hexacosadienoic,--.

Signed and sealed this 31st day of August 1971.

(SEAL)
Attest:

EDWARD M. FLETCHER, JR.
Attesting Officer

WILLIAM E. SCHUYLER, JR.
Commissioner of Patents